(12) United States Patent
Jayaraman et al.

(10) Patent No.: US 9,280,739 B2
(45) Date of Patent: Mar. 8, 2016

(54) COMPUTER IMPLEMENTED SYSTEM FOR AUTOMATING THE GENERATION OF A BUSINESS DECISION ANALYTIC MODEL

(71) Applicant: DXCONTINUUM INC., Fremont, CA (US)

(72) Inventors: Baskar Jayaraman, Fremont, CA (US); Debashish Chatterjee, Fremont, CA (US); Kannan Govindarajan, Sunnyvale, CA (US); Ganesh Rajan, Saratoga, CA (US)

( * ) Notice: Subject to any disclaimer, the term of this patent is extended or adjusted under 35 U.S.C. 154(b) by 274 days.

(21) Appl. No.: 14/093,403

(22) Filed: Nov. 29, 2013

(65) Prior Publication Data
US 2014/0156581 A1    Jun. 5, 2014

Related U.S. Application Data

(60) Provisional application No. 61/731,595, filed on Nov. 30, 2012.

(51) Int. Cl.
*G06F 17/00* (2006.01)
*G06N 5/02* (2006.01)

(52) U.S. Cl.
CPC ........................................ *G06N 5/02* (2013.01)

(58) Field of Classification Search
None
See application file for complete search history.

(56) References Cited

U.S. PATENT DOCUMENTS

| | | | | |
|---|---|---|---|---|
| 7,827,141 B2 * | 11/2010 | Bande | ................. | G06F 17/3048 707/622 |
| 7,930,344 B2 * | 4/2011 | Chidambaran | ....... | G06F 9/5088 709/203 |
| 8,161,536 B1 * | 4/2012 | Subramaniam | ..... | H04L 63/0884 707/782 |
| 8,209,201 B1 * | 6/2012 | Yuasa | ................. | G06Q 10/063 705/301 |
| 8,300,777 B1 * | 10/2012 | Lerda | ...................... | H04M 1/56 345/1.2 |

(Continued)

OTHER PUBLICATIONS

Empirical Study on the Efficiency of Search Based Test Generation for EFSM Models Zhao, R.; Harman, M.; Zheng Li Software Testing, Verification, and Validation Workshops (ICSTW), 2010 Third International Conference on Year: 2010 pp. 222-231, DOI: 10.1109/ICSTW.2010.44 Referenced in: IEEE Conference Publications.*

(Continued)

*Primary Examiner* — Michael B Holmes
(74) *Attorney, Agent, or Firm* — Armstrong Teasdale LLP

(57) ABSTRACT

The present invention envisages a system and method for automating the generation of business decision analytic models. The system uses a plurality of predictor variables stored in a plurality of data sets, to automatically create a business decision analytic model. The system includes a processor configured to process the data sets and determine the total number of records present in each of the data sets and the number of columns containing only numerical values. The processor selects a column containing only numerical values, from a dataset under consideration, and counts the number of unique numerical values in the selected column, and the total number of records present in the selected column. The two counts are compared and the selected column is transformed using a non-linear transformation to obtain a column of transformed values. The transformed values and corresponding time stamps are utilized for the purpose of model generation.

14 Claims, 2 Drawing Sheets

(56) References Cited

U.S. PATENT DOCUMENTS

| | | | | |
|---|---|---|---|---|
| 8,365,193 B2 * | 1/2013 | Chidambaran | G06F 9/466 | 707/799 |
| 8,483,366 B2 * | 7/2013 | Lerda | H04M 1/56 | 340/309.7 |
| 8,493,869 B2 * | 7/2013 | Udupi | H04L 45/04 | 370/231 |
| 8,656,269 B1 * | 2/2014 | Yuasa | G06F 17/30896 | 715/212 |
| 8,781,845 B1 * | 7/2014 | Burg | G06Q 10/06 | 705/1.1 |
| 8,825,805 B2 * | 9/2014 | Gollapudi | G06F 17/30595 | 709/219 |
| 8,958,775 B2 * | 2/2015 | Lerda | H04M 3/53325 | 455/412.1 |
| 9,031,209 B2 * | 5/2015 | Lerda | H04M 1/56 | 370/232 |

OTHER PUBLICATIONS

An Approach for Incorporating Context in Building Probabilistic Predictive Models Wu, J.A.; Hsu, W.; Bui, A.A.T. Healthcare Informatics, Imaging and Systems Biology (HISB), 2012 IEEE Second International Conference on Year: 2012 pp. 96-105, DOI: 10.1109/HISB.2012.30 Referenced in: IEEE Conference Publications.*

Smart grid data analytics for decision support Ranganathan, P.; Nygard, K. Electrical Power and Energy Conference (EPEC), 2011 IEEE Year: 2011 pp. 315-321, DOI: 10.1109/EPEC.2011.6070218 Referenced in: IEEE Conference Publications.*

A hybrid nonlinear model for the annual maximum simultaneous electric power demand Shakouri G, H.; Rastad, M.; Nazarzadeh, J. Power Systems, IEEE Transactions on Year: 2006, vol. 21, Issue: 3 pp. 1069-1078, DOI: 10.1109/TPWRS.2006.873105 Referenced in: IEEE Journals & Magazines.*

* cited by examiner

COMPUTER IMPLEMENTED SYSTEM FOR AUTOMATING THE GENERATION OF A BUSINESS DECISION ANALYTIC MODEL

CROSS REFERENCE TO RELATED APPLICATIONS

This application claims the priority of U.S. Provisional Patent Application with Ser. No. 61/731,595, filed on Nov. 30, 2012, the contents of which are incorporated entirely herein.

BACKGROUND

1. Technical Field

The present invention relates to the field of data modeling. Particularly, the present invention relates to automatic generation of business decision analytic models.

2. Description of the Related Art

The task of model generation, especially generation of models which are business centric and involved business decision making, is a task that depends on availability and scrutiny of large volume of information. The process of model generation has always been an information centric process which dwells on the availability of quality information corresponding to the problem domain the analytic model expected to cater to.

However, given the exponential increase in the amount/volume of data available with respect to any particular problem domain, the task of choosing the right set of data/variables for model generation becomes a cumbersome task. Wide spread use of the internet and collaboration and consumer platforms like social media and online shopping are resulting in enormous amount of data being generated via blogs, social interactions, product reviews etc. In addition, the machines being used in the process (computers, smart phones, network equipment and the like) are also contributing to the data growth.

The availability of larger volumes of data has resulted in a situation where selecting an appropriate set of variables for model creation becomes a cumbersome task. Further, until recently analytic model generation was carried out manually. The process of manual generation of analytic/predictive models was a complicated task by itself and required huge investments in terms of time-frames and man power. Moreover, human decisions and judgments in terms of variable selection for model generation are prone to errors which could in turn compromise the efficiency and effectiveness of the generated analytic models.

Therefore, there was felt a need for a system which obviated manual intervention and automated the entire process of model generation. Moreover, another challenge in the arena of model generation was to generate a model that is adaptable and flexible enough to incorporate the changes in the data inflow. Therefore, there was felt a need for system that not only automated the generation of analytic models, especially business critical analytic models but also converts unstructured data into structured information before using the same in the process of model generation. There was also felt a need for a system which puts in to use the phenomenon of automation in order to bring down the time associated with model creation and model updating. There was also felt a need for a system that is capable of automatically regenerating a previously created analytic model based on the inflow of newer data.

The above mentioned shortcomings, disadvantages and problems are addressed herein and which will be understood by reading and studying the following specification.

OBJECTS

An object of the present invention is to provide a system and method that generates structured information from unstructured data.

Yet another object of the present invention is to provide a system and method that automatically computes modeling variables including transformations, for generation of relatively effective analytic models.

Still a further object of the present invention is to provide a system and method that automatically tests the generated models for efficiency and selects the model with optimal efficiency.

One more object of the present invention is to provide a system and method that generates a problem-appropriate library of analytic models.

Another object of the present invention is to provide a system and method that automates the generation of business decision analytic models.

One more object of the present invention is to provide as system and method that provides for rapid building, ease of use and management of analytic models.

These and other objects and advantages of the present embodiments will become readily apparent from the following detailed description taken in conjunction with the accompanying drawings.

SUMMARY

The present disclosure envisages a computer implemented system for automating the generation of an analytic model. The system comprises a repository configured to store a plurality of data sets, each of the data sets comprising at least predicted variables, the predicted variables utilized for generating the analytic model.

The system further comprises a processor configured to process the data sets. The processor, in accordance with the present invention includes a determinator configured to determine the total number of records present in each of the data sets, the determinator further configured to determine the columns of the data sets containing only numerical values.

The processor further comprises a selector cooperating with the determinator and configured to select a column containing only numerical values, from a dataset under consideration, the selector comprising a counter configured to count the number of unique numerical values in selected column, the counter further configured to count the total number of records present in selected column.

The processor further comprises a comparator configured to compare the number of unique values in the selected column and the total number records in the selected column.

The processor further comprises a transformation module configured to transform the selected column by applying a non-linear transformation to each of the values in the selected column and generate respective transformed values, in the event that the number of unique values in the selected column is less than the total records in the selected column, the transformation module further configured to replace the unique values with the transformed values.

The processor further comprises a time stamping module configured to determine whether there exists a time stamp corresponding to each of the rows in the dataset under consideration, the time stamping module further configured to calculate a plurality of time lags corresponding to each of the rows, the time lags having predetermined orders.

The processor further comprises a data creator configured to create a processed data set, the processed data set comprising a plurality of rows, each row containing columns having the transformed values.

The processor further comprises a model generator configured to create a first analytic model based on at least the processed data set.

In accordance with the present invention, the system further comprises a model testing module having access to a module quality evaluation metric, the model testing module configured to test the analytic model developed by the model creator.

In accordance with the present invention, the model testing module further comprises a splitter configured to split the processed data set into at least a first set and a second set.

In accordance with the present invention, the model testing module includes a second selector configured to select at least one data item for omission from the first set and the second set and create a new first set and new second set by omitting the selected data item, the second creator further configured to transmit the new first set and new second set to the model generator for generation of a second analytic model.

In accordance with the present invention, the model testing module further comprises a second comparator configured to compare the first analytic model with the second analytic model and determine whether the second analytic model is an enhancement over the analytic model in terms of model quality, the second comparator configured to exclude the data item from the new first set and second set in the event that the second analytic model is not an enhancement over the first analytic model in terms of quality.

In accordance with the present invention, the splitter is configured to split the processed data set into the first data set and second set in a chronological order, the chronological order identifying the order in which each of the rows of the processed dataset were previously created.

In accordance with the present invention, the splitter is configured to split the processed data set into the first set and second set in a pre-specified order, in the event that no chronological order data is available, the splitter further configured to randomly shuffle the data items in the processed data set prior to splitting the processed data set.

In accordance with the present invention, the system further includes a model updating module, the updating module configured to update the analytic model in a stateful manner.

In accordance with the present invention, the model updating module is further configured to update the analytic model in a stateless manner.

In accordance with the present invention, the system further comprises a converter configured to convert unstructured data into structured information, the convertor cooperating with the repository to store the structured information in the form of the data sets, the convertor comprising a receiving module configured to receive the unstructured data; a filter configured to filter the unstructured data to identify and retrieve a plurality of sections of unstructured data based on the relevance of the unstructured data to the creation of the analytic model, a natural language processing engine configured to receive the sections of unstructured data and break the sections into a plurality of meaningful sentences using natural language processing tools; and a parser configured to parse the plurality of meaningful sentences and retrieve a plurality of keywords from the meaningful sentences.

In accordance with the present invention, the convertor is further configured to assign a weight value and a sentiment value to each of the keywords, and categorize the keywords into a plurality of categories based on a predetermined categorization criteria thereby converting the unstructured data into structured data.

The present invention envisages a computer implemented method for automating the generation of an analytic model. The method, in accordance with the present disclosure comprises the following computer implemented steps: storing, in a repository, a plurality of data sets, each of the data sets comprising at least predicted variables, the predicted variables utilized for generating the analytic model; determining the total number of records present in each of the data sets, and determining the columns of the data sets containing only numerical values; selecting a column containing only numerical values, from a dataset under consideration; counting the number of unique values in selected column, and counting the total number of records present in the selected column; comparing the number of unique values in the selected column and the total number records in the selected column; transforming the selected column by applying a non-linear transformation to each of the values in the selected column and generating respective transformed values, only in the event that the number of unique values in the selected column is less than the total records in the selected column; replacing the unique values in each of the selected columns with the transformed values; determining whether there exists a time stamp corresponding to each of the rows in the dataset under consideration, and calculating a plurality of time lags corresponding to each of the rows, the time lags having predetermined orders; creating a processed data set, the processed data set comprising a plurality of rows, each row containing columns having the transformed values; and creating a first analytic model based on at least the processed data set.

In accordance with the present invention, the method further comprises the step of evaluating the first analytic model using a model quality evaluation metric, the step further comprising the following steps: splitting the processed data set into at least a first set and a second set; selecting at least one data item for omission from the first set and the second set and creating a new first set and new second set by omitting the selected data item, and transmitting the new first set and new second set to the model creator for creation of a second analytic model; and comparing the first analytic model with the second analytic model and determining whether the second analytic model is an enhancement over the first analytic model in terms of model quality, and excluding the selected data item from the new first set and second set in the event that the second analytic model is not an enhancement over the first analytic model, in terms of model quality.

In accordance with the present invention, the step of splitting the processed data set into at least a first set and a second set, further includes the step of splitting the processed data set into the first data set and second set in a chronological order, the chronological order identifying the order in which each of the rows of the processed dataset were previously created.

In accordance with the present invention, the step of splitting the processed data set into at least a first set and a second set, further includes the step of splitting the processed data set into the first set and second set in a pre-specified order, in the event that no chronological order data is available, and randomly shuffling the data items in the processed data set prior to splitting the processed data set.

In accordance with the present invention, the method further includes the step of updating the first analytic model in a stateful manner.

In accordance with the present invention, the method further includes the step of updating the first analytic model in a stateless manner.

In accordance with the present invention, the method further includes the step of converting unstructured data into structured information, and storing the structured information in the form of data sets in a repository, wherein the step of converting unstructured data into structured data includes the following steps: receiving the unstructured data; filtering the unstructured data to identify and retrieving a plurality of sections of unstructured data based on the relevance of the unstructured data to the creation of the analytic model; receiving the sections of unstructured data at a natural language processing engine and breaking the sections into a plurality of meaningful sentences; parsing the plurality of meaningful sentences and retrieving a plurality of keywords from the meaningful sentences; and assigning a weight value and a sentiment value to each of the keywords, and categorizing the keywords into a plurality of categories based on a predetermined categorization criteria thereby converting the unstructured data into structured information.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others, this has been done for convenience only as each feature of the invention may be combined with any or all of the other features in accordance with the embodiments herein.

DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The present invention envisages a computer implemented system and method for automating the generation of an analytic model, typically a business decision analytic model. The system and method envisaged by the present invention proposes breaking down the steps involved in model generation and provides for rapid building, utilization and automated maintenance of the analytic model. The system and method envisaged by the present invention automates the process of analytic model building by utilizing specifically designed software tools, thereby reducing the build time and use time associated with analytic models. In addition, the present invention also provides for quality enhancement of the crated analytic models by enabling automatic model selection and automatic model regeneration.

Figure 1:
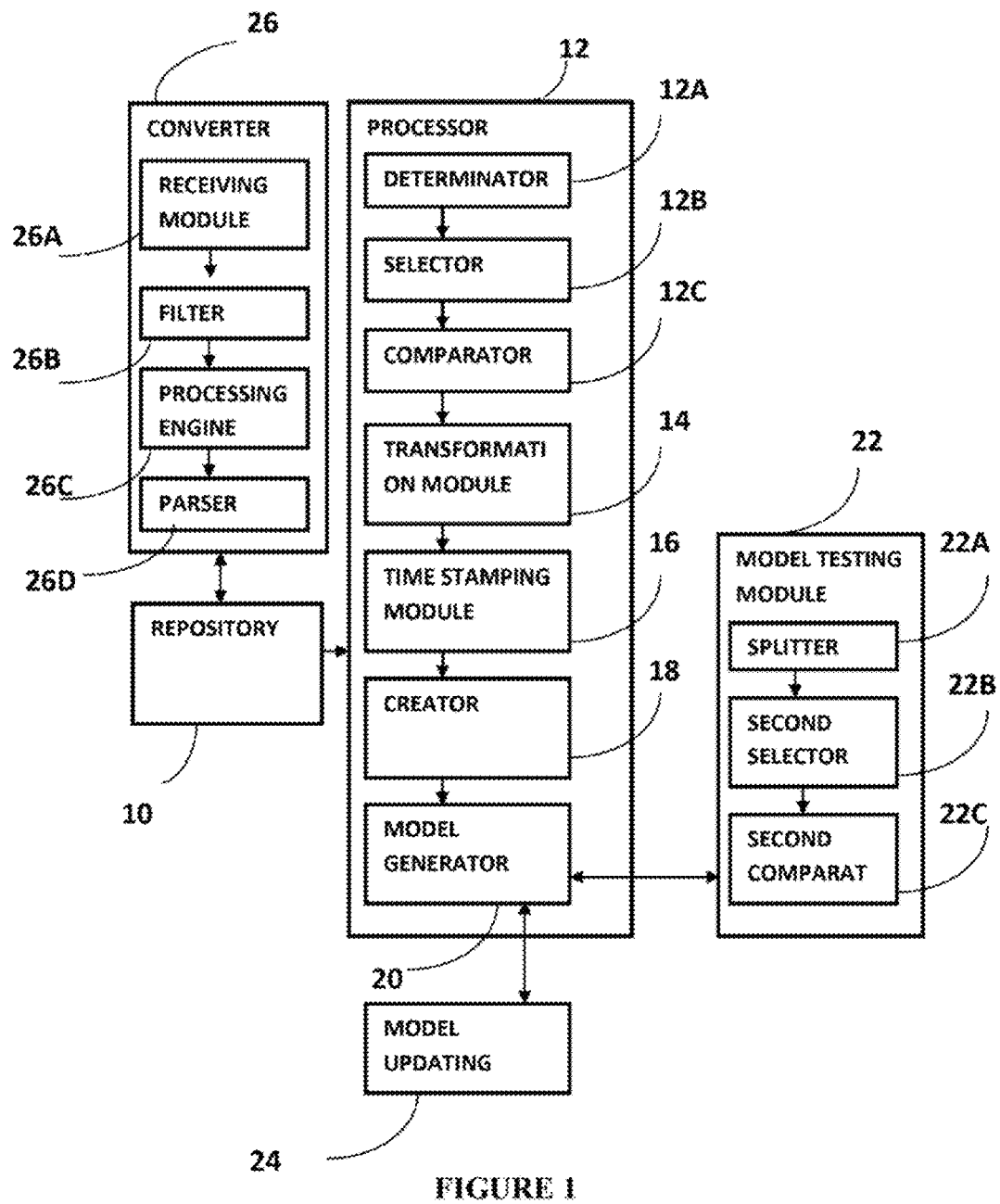
FIG. 1 is a system level block-diagram illustrating the components of the computer-implemented system for automating the generation of business decision analytic model.

Referring to FIG. 1, the computer implemented system 100 for automating the generation of an analytic model is shown. The system 100, in accordance with the present invention comprises a repository 10 configured to store a plurality of data sets. The data sets stored in the repository comprise predictor variables which are to be utilized for generating the analytic model. The system 100 further includes a processor 12 configured to process the predictor variables and generate an analytic model.

In accordance with the present invention, the processor 12 comprises a determinator 12A configured to determine the total number of records present in each of the data sets stored in the repository 10. The determinator 12A is further configured to identify the columns of the data sets containing only numerical values. Further, the columns of the datasets containing only numerical values are forwarded to a selector 12B. The selector 12B selects a column containing only numerical values (numeric column) from one particular data set (data set under consideration) at a time. The selector 12B further comprises a counter 121 configured to count the number of unique values in the selected column. Further the counter 121 counts the number of total records present in the selected column.

In accordance with the present invention, the system 100 further includes a comparator 12C configured to compare the total number of unique values in the selected column with the total number records in the selected column. The comparator 12C compares the number of numeric columns with the total number unique values so as to determine/identify the exact number of columns around which the data is clustered. The number of unique values in the selected column being less than the total number of records in the selected column indicates that the data is clustered around a small group of values, and transformation of such a column and utilization of the same in model generation would be relatively non-cumbersome task. If a particular dataset is clustered around a few unique numerical values, computing a nonlinear transformation such as obtaining the logarithm of the variables would act as a value addition to the quality of the model, and improves the overall quality of analytic models since not only the variables but their respective logarithmic values are also being utilized for the purpose of model generation. The comparator 12C, based on the output of the comparison, selectively transmits the selected column to the transformation module 14.

In accordance with the present invention, the transformation module 14 transforms the column transmitted by the comparator 12C by applying a non-linear transformation to each of the values in the selected column. Further, the transformation module replaces the original numeric values present in each of the cells of the column with the respective transformed values.

In accordance with the present invention, the system 100 further includes a time stamping module denoted by the reference numeral 16. The time stamping module accesses the columns transformed by the transformation module 14 and determines if there exists any timestamp denoting the date and time on which the data in the cells were created. The time stamping module 16, unlike the comparator module 12C takes into consideration a row of the data set (under consideration) and determines whether the row of data has been time stamped.

In the event that a row of data in the data set under consideration has been time stamped, the time stamping module creates time lags corresponding to each row of data. For example, the time stamping module 16 considers the time elapsed between $n^{th}$ row of data and the $(n+1)^{th}$ row as the first order time lag of data arrival, and associates this time lag with $(n+1)^{th}$ row. Similarly the time stamping module 16 calculates the first order time lags for all the available rows of data. Further, the second order time lag for all the data rows is calculated by considering the time elapsed between $n^{th}$ row of data and the $(n+1)^{th}$ row of data, and associates the calculated second order time lag with the $(n+1)^{th}$ row. In case of availability of time stamps for the row of data under consideration, the time stamping module 16 creates time-lagged variables of pre-determined degrees (first degree and second degree) and evaluates the importance of the time-lagged variables in terms of their contribution to the model quality, and automatically chooses the optimal time lag (either the first order lag or the second order lag). In case of availability of time stamps, the time stamping module 16 also computes variables that indicating how time impacts the observations. An example is the elapsed time for a variable to move from one value to another. The time stamping module 16 computes a library of such variables and provides for automatic evaluation of their utility.

The system 100, in accordance with the present invention further includes a creator 18 configured to create a processed data set. The processed data set comprises transformed values arranged in a tabular format, i.e., in terms of rows and columns. The creator 18 cooperates with a model generator 20 which makes use of the processed data set and creates an analytic model (also referred to as the baseline model) using the processed data set.

In accordance with another aspect of the present invention, the system 100 further includes a model testing module 22 having access to a module quality evaluation metric. The model testing module 22 tests the analytic model developed by the model generator 20. The model testing module comprises 22 a splitter 22A having access to the processed data set used for creating the analytic model. The splitter 22A splits the processed data set into typically a first set and a second set, in accordance with a pre-determined criterion. For example, if the split criterion is 2:1, $\frac{2}{3}^{rd}$ of the earliest data is selected as the model development data and $\frac{1}{3}^{rd}$ of the later data is selected as the test data. However, it is within the scope of the present invention that the processed data set can be split into more than two sets. In accordance with another aspect of the present invention, 70% of the processed data set is considered as the model development data and the rest (30%) is considered as the model test data.

The testing module 22 further comprises a second selector 22B which select at least one data item for omission from the first set and the second set and creates a new first set and new second set omitting the selected data items. Several factors are taken into consideration by the testing module 22 for selecting a variable for omission. For example, a variable having the lowest information gain against the predicted variable can be dropped, a variable that has the lowest variability is the first one to be dropped and a variable that has missing data can be dropped.

The creation of new first set and the second set provides a base case to evaluate how an analytic model that does not include a particular variable would perform. The second creator 22B transmits the new first set and new second set to the model generator 20 for the creation of a second analytic model.

The model testing module 22 further includes a second comparator 22D which compares the analytic model (baseline model) with the second analytic model and determines whether the quality of the second analytic model is better than the baseline model. The second comparator 22D is further configured to eliminate the data item (which was selected for exclusion) from the new first set and second set in the event that the quality of new analytic model is not inferior to the quality of the baseline model. In the event that the quality of the new analytic model is inferior to the quality of the baseline model, then the data item, initially selected for exclusion would be retained. In this manner an analytic model created by the system 100 is iteratively tested and the quality of the model is improvised upon.

In accordance with the present invention, the splitter 22A is configured to split the processed data set into first data set and second set in a chronological order, wherein the chronological order identifies the order in which each of the rows of the processed dataset were previously created. Further, the splitter 22A can also split the processed data set into first set and second set in a pre-specified order, in the event that no chronological order data is available. In such a case, the splitter 22A randomly shuffles the data items of the processed data set prior to splitting the data set.

In accordance with the present invention, the system further includes a model updating module 24. The model updating module 24 is configured to update the analytic model, typically the baseline model, in a stateful manner. Stateful model updating is invoked for those model forms where this method can be used. For example, linear regression model can be incrementally built such that only the new data needs to be presented to the model generation along with a minimal state information from the time this model was generated the last time.

The model updating module 24 is also configured to update the analytic model in a stateless manner. Stateless model updating is computationally more expensive. It is done where the underlying analytic model form does not yield itself to the less expensive stateful model updating. For example, a neural network model does not lend itself to an incremental updating where the current model that was built on historical data is relearnt with the new data. In such cases, the current model is discarded and the model is fully learnt using the full data that includes as much data as necessary and will include historical data and current data.

For example, consider a model that is generated using data that was generated over a time window indicated by [T1, T2] where T1 is the data start time and T2 is the data end time. After some time has elapsed, new data becomes available over the time window [T2+1, T3]. An analytic model that is amenable to stateful update, is updated/regenerated by the model updating module 24 using just the new [T2+1, T3] data without it discarding what has been modeled over [T1, T2]. An analytic model that is not amenable to stateful update will be updated/regenerated using just the full [T1, T3] data.

In accordance with another aspect of the present invention, the system 100 further comprises a converter 26 configured to convert unstructured data into structured information and store the structured information in the form of data sets in the repository 10 for the purpose of automation of generation of analytic model. Unstructured data is a term used to describe data that is a mixture of textual and non-textual data. Unstructured non-textual data generally relates to media related data such as images, video and audio files. As the volumes of this type of data increases, the need to analyze and understand it grows too. Slightly easier to analyze and less unwieldy are unstructured textual data made up of different file types (documents, spreadsheets and presentations), email messages, social media postings and an array of other files generated and stored on corporate networks. For example determining the level of satisfaction of customers by analyzing emails and social media postings may involve searching for words or phrases.

The converter 26 comprises a receiving module 26A configured to receive the unstructured data. A filter 26B filters the unstructured data to identify and retrieve a plurality of sections of unstructured data based on the relevance of the unstructured data to the creation of the analytic model. Further, a natural language processing tool 26C receives the sections of unstructured data and breaks the sections of unstructured data into a plurality of meaningful sentences using natural language processing tools. A parser 26D parses the plurality of meaningful sentences and retrieves a plurality of keywords from the meaningful sentences.

The converter 26 is further configured to assign a weight value and a sentiment value to each of the keywords, and categorize said keywords into a plurality of categories based on a pre-determined categorization criteria thereby converting said unstructured data into structured information which is stored in the repository 10 and utilized for creating the analytic model. The converter 26 groups the words and phrases into positive, negative or neutral classifications, thereby transforming the unstructured data into structured data where the groups of words found based upon their classification are assigned a value. A positive word may be assigned a numeric value of 1, a negative may be assigned a numeric value of −1 and a neutral may be assigned a numeric value of 0.

In accordance with the present invention, the system 100 creates a plurality of analytic models for a given problem. The system 100 considers one of the models as the baseline model and the baseline model will be placed in service until it is replaced. All the models, other than the baseline model are in the background—not in production yet but ready to challenge the incumbent model (baseline model). The baseline model is the model that produces the best performance over the test data. On an ongoing basis, as new data flows through the system 100, each model, including the incumbent baseline model, is evaluated against the new data. The model the produces the best performance over the new data becomes the new baseline model replacing the incumbent.

Figure 2:
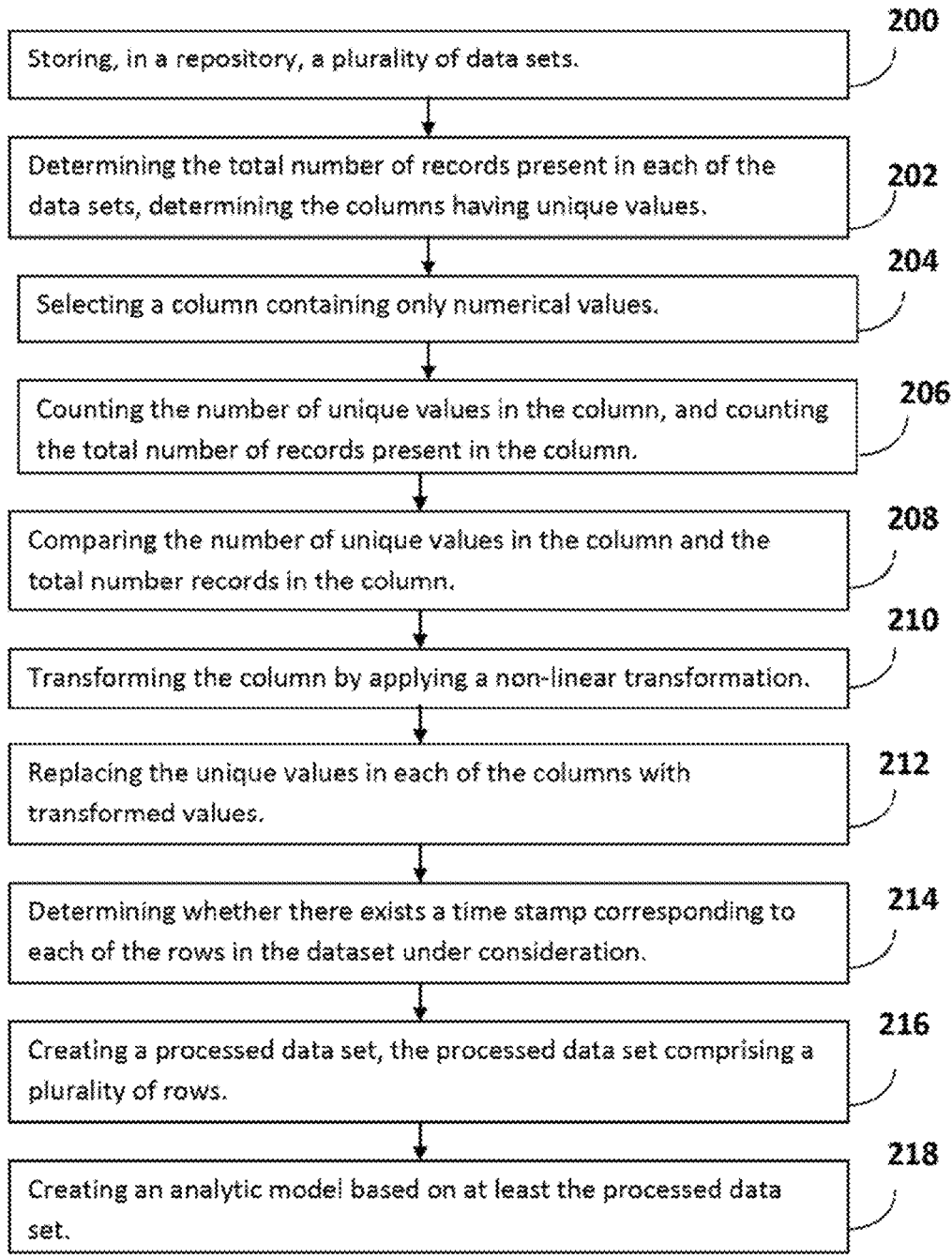
FIG. 2 is a flowchart illustrating the steps involved in the computer-implemented method for automating the generation of business decision analytic model.

Referring to FIG. 2, there is shown a computer implemented method for automating the generation of an analytic model. The method, in accordance with the present invention comprises the following computer implemented steps: storing, in a repository, a plurality of data sets, each of the data sets comprising at least predicted variables, the predicted variables utilized for generating the analytic model (200); determining the total number of records present in each of the data sets, and determining the columns of the data sets containing only numerical values (202); selecting a column containing only numerical values, from a dataset under consideration (204); counting the number of unique values in the column, and counting the total number of records present in the column (206); comparing the number of unique values in the column and the total number records in the column (208); transforming the column by applying a non-linear transformation to each of the values in the column and generating respective transformed values, in the event that the number of unique values in the column is less than the total records in the column (210); replacing the unique values in each of the columns with the transformed values (212); determining whether there exists a time stamp corresponding to each of the rows in the dataset under consideration, and calculating a plurality of time lags corresponding to each of the rows, the time lags having predetermined orders (214); creating a processed data set, the processed data set comprising a plurality of rows, each row containing columns having the transformed values (216); and creating an analytic model based on at least the processed data set (218).

In accordance with the present invention, the method further comprises the step of evaluating the analytic model using a model quality evaluation metric, the step further comprising the following steps: splitting the processed data set into at least a first set and a second set; selecting at least one data item for omission from the first set and the second set and creating a new first set and new second set, and transmitting the new first set and new second set to the model creator for creation of a second analytic model; and comparing the analytic model with the second analytic model and determine whether the quality of the second analytic model is better than the analytic model, and excluding the data item from the new first set and second set in the event that the quality of new analytic model is not inferior to the quality of the baseline model.

In accordance with the present invention, the step of splitting the processed data set into at least a first set and a second set, further includes the step of splitting the processed data set into the first data set and second set in a chronological order, the chronological order identifying the order in which each of the rows of the processed dataset were previously created.

In accordance with the present invention, the step of splitting the processed data set into at least a first set and a second set, further includes the step of splitting the processed data set into the first set and second set in a pre-specified order, in the event that no chronological order data is available, and randomly shuffling the data items in the processed data set prior to splitting the processed data set.

In accordance with the present invention, the method further includes the step of updating the analytic model in a stateful manner. In accordance with the present invention, the method further includes the step of updating the analytic model in a stateless manner.

In accordance with the present invention, the method further includes the step of converting unstructured data into structured data, and storing the structured data in the form of data sets, in a repository, wherein the step of converting unstructured data into structured data includes the following steps: receiving the unstructured data; filtering the unstructured data to identify and retrieving a plurality of sections of unstructured data based on the relevance of the unstructured data to the creation of the analytic model; receiving the sections of unstructured data at a natural language processing engine and breaking the sections into a plurality of meaningful sentences; parsing the plurality of meaningful sentences and retrieving a plurality of keywords from the meaningful sentences; and assigning a weight value and a sentiment value to each of the keywords, and categorizing the keywords into a plurality of categories based on a pre-determined categorization criteria thereby converting the unstructured data into structured data.

The technical advantages of the present invention include the realization of a system and method that automates generation of a business decision analytic model. The system proposed by the present invention makes use of structured information for creating analytic models. The system envisaged by the present invention converts the unstructured data into structured information. The system makes use of the best possible set of variables to create an analytic model thereby ensuring that the analytic models created by the system are relatively effective and efficient in addressing the requirements of the problem domain they belong to.

The system envisaged by the present invention makes use of the structured information to create a library of problem specific models. Further, the system tests each of the candidate models in the library of models for efficiency and selects the model with optimum efficiency as the baseline model. The system envisaged by the present invention provides for continuous updating and improvement of existing analytic models in a seamless manner, by incorporating the changed input data elements with ease into the existing analytic models.

The foregoing description of the specific embodiments will so fully reveal the general nature of the embodiments herein that others can, by applying current knowledge, readily modify and/or adapt for various applications without departing from the generic concept, and, therefore, such adaptations and modifications should and are intended to be comprehended within the meaning and range of equivalents of the disclosed embodiments. It is to be understood that the terminology employed herein is for the purpose of description and not of limitation. Therefore, while the embodiments herein have been described in terms of preferred embodiments, those skilled in the art will recognize that the embodiments herein can be practiced with modification.

What is claimed is:

1. A computer implemented system for automating the generation of an analytic model, said system comprising:
   a repository configured to store a plurality of data sets, each of said data sets comprising at least predicted variables, said predicted variables utilized for generating said analytic model;
   a processor configured to process said data sets, said processor comprising:
      a determinator configured to determine the total number of records present in each of said data sets, said determinator further configured to determine the columns of the data sets containing only numerical values;
      a selector cooperating with said determinator and configured to select a column containing only numerical values, from a dataset under consideration, said selector comprising a counter configured to count the number of unique numerical values in selected column, said counter further configured to count the total number of records present in selected column;
      a comparator configured to compare the number of unique values in said selected column and the total number records in said selected column;
      a transformation module configured to transform said selected column by applying a non-linear transformation to each of the values in said selected column and generate respective transformed values, in the event that the number of unique values in said selected column is less than the total records in said selected column, said transformation module further configured to replace said unique values with said transformed values;
      a time stamping module configured to determine whether there exists a time stamp corresponding to each of the rows in said dataset under consideration, said time stamping module further configured to calculate a plurality of time lags corresponding to each of the rows, said time lags having predetermined orders;
      a data creator configured to create a processed data set, said processed data set comprising a plurality of rows, each row containing columns having said transformed values; and
   a model generator configured to create a first analytic model based on at least said processed data set.

2. The system as claimed in claim 1, wherein said system further comprises a model testing module having access to a module quality evaluation metric, said model testing module configured to test said analytic model developed by said model creator, said model testing module comprising:
   a splitter configured to split said processed data set into at least a first set and a second set;
   a second selector configured to select at least one data item for omission from said first set and said second set and create a new first set and new second set by omitting the selected data item, said second creator further configured to transmit said new first set and new second set to the model generator for generation of a second analytic model; and
   a second comparator configured to compare said first analytic model with said second analytic model and determine whether the second analytic model is an enhancement over the analytic model in terms of model quality, said second comparator configured to exclude said data item from said new first set and second set in the event that the second analytic model is not an enhancement over the first analytic model in terms of quality.

3. The system as claimed in claim 2, wherein said splitter is configured to split said processed data set into said first data set and second set in a chronological order, said chronological order identifying the order in which each of the rows of said processed dataset were previously created.

4. The system as claimed in claim 2, wherein said splitter is configured to split said processed data set into said first set and second set in a pre-specified order, in the event that no chronological order data is available, said splitter further configured to randomly shuffle the data items in said processed data set prior to splitting said processed data set.

5. The system as claimed in claim 1, wherein said system further includes a model updating module, said updating module configured to update said analytic model in a stateful manner.

6. The system as claimed in claim 5, wherein said model updating module is further configured to update said analytic model in a stateless manner.

7. The system as claimed in claim 1, wherein said system further comprises a converter configured to convert unstructured data into structured information, said convertor cooperating with said repository to store said structured information in the form of the data sets, said convertor comprising:
   a receiving module configured to receive said unstructured data;
   a filter configured to filter said unstructured data to identify and retrieve a plurality of sections of unstructured data based on the relevance of the unstructured data to the creation of the analytic model,
   a natural language processing engine configured to receive said sections of unstructured data and break said sections into a plurality of meaningful sentences using natural language processing tools;
   a parser configured to parse said plurality of meaningful sentences and retrieve a plurality of keywords from said meaningful sentences;
said convertor further configured to assign a weight value and a sentiment value to each of said keywords, and categorize said keywords into a plurality of categories based on pre-determined categorization criteria thereby converting said unstructured data into structured data.

8. A computer implemented method for automating the generation of an analytic model, said method comprising the following computer implemented steps:
- storing, in a repository, a plurality of data sets, each of said data sets comprising at least predicted variables, said predicted variables utilized for generating said analytic model;
- determining the total number of records present in each of said data sets, and determining the columns of the data sets containing only numerical values;
- selecting a column containing only numerical values, from a dataset under consideration;
- counting the number of unique values in selected column, and counting the total number of records present in said selected column;
- comparing the number of unique values in said selected column and the total number records in said selected column;
- transforming said selected column by applying a non-linear transformation to each of the values in said selected column and generating respective transformed values, only in the event that the number of unique values in said selected column is less than the total records in said selected column;
- replacing said unique values in each of said selected columns with said transformed values;
- determining whether there exists a time stamp corresponding to each of the rows in said dataset under consideration, and calculating a plurality of time lags corresponding to each of the rows, said time lags having predetermined orders;
- creating a processed data set, said processed data set comprising a plurality of rows, each row containing columns having said transformed values; and
- creating a first analytic model based on at least said processed data set.

9. The method as claimed in claim 8, wherein said method further comprises the step of evaluating the first analytic model using a model quality evaluation metric, said step further comprising the following steps:
- splitting said processed data set into at least a first set and a second set;
- selecting at least one data item for omission from said first set and said second set and creating a new first set and new second set by omitting the selected data item, and transmitting said new first set and new second set to the model creator for creation of a second analytic model; and
- comparing said first analytic model with said second analytic model and determining whether the second analytic model is an enhancement over the first analytic model in terms of model quality, and excluding said selected data item from said new first set and second set in the event that the second analytic model is not an enhancement over the first analytic model, in terms of model quality.

10. The method as claimed in claim 8, wherein the step of splitting said processed data set into at least a first set and a second set, further includes the step of splitting said processed data set into said first data set and second set in a chronological order, said chronological order identifying the order in which each of the rows of said processed dataset were previously created.

11. The method as claimed in claim 8, wherein step of splitting said processed data set into at least a first set and a second set, further includes the step of splitting said processed data set into said first set and second set in a pre-specified order, in the event that no chronological order data is available, and randomly shuffling the data items in said processed data set prior to splitting said processed data set.

12. The method as claimed in claim 8, wherein said method further includes the step of updating said first analytic model in a stateful manner.

13. The method as claimed in claim 12, wherein said method further includes the step of updating said first analytic model in a stateless manner.

14. The method as claimed in claim 8, wherein the method further includes the step of convening unstructured data into structured information, and storing said structured information in the form of data sets in a repository, wherein the step of converting unstructured data into structured data includes the following steps:
- receiving said unstructured data;
- filtering said unstructured data to identify and retrieving a plurality of sections of unstructured data based on the relevance of the unstructured data to the creation of the analytic model,
- receiving said sections of unstructured data at a natural language processing engine and breaking said sections into a plurality of meaningful sentences;
- parsing said plurality of meaningful sentences and retrieving a plurality of keywords from said meaningful sentences; and
- assigning a weight value and a sentiment value to each of said keywords, and categorizing said keywords into a plurality of categories based on a pre-determined categorization criteria thereby converting said unstructured data into structured information.

* * * * *